United States Patent
Jeong

(10) Patent No.: US 12,519,168 B2
(45) Date of Patent: Jan. 6, 2026

(54) BATTERY PROTECTION STRUCTURE FOR BATTERY-EQUIPPED VEHICLE

(71) Applicants: Hyundai Motor Company, Seoul (KR); Kia Corporation, Seoul (KR)

(72) Inventor: Seung Min Jeong, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 303 days.

(21) Appl. No.: 18/220,076

(22) Filed: Jul. 10, 2023

(65) Prior Publication Data

US 2024/0222774 A1    Jul. 4, 2024

(30) Foreign Application Priority Data

Dec. 28, 2022   (KR) .................. 10-2022-0187335

(51) Int. Cl.
  *H01M 50/249*  (2021.01)
  *H01M 50/242*  (2021.01)
  *H01M 50/244*  (2021.01)

(52) U.S. Cl.
  CPC ....... *H01M 50/249* (2021.01); *H01M 50/242* (2021.01); *H01M 50/244* (2021.01); *H01M 2220/20* (2013.01)

(58) Field of Classification Search
  CPC ............ H01M 10/625; H01M 50/249; H01M 50/242; H01M 50/244; B62D 25/20; B62D 25/025; B60K 1/04
  See application file for complete search history.

(56) References Cited

U.S. PATENT DOCUMENTS

| | | | |
|---|---|---|---|
| 10,946,903 B2 * | 3/2021 | Viaux | B62D 29/007 |
| 2015/0239331 A1 | 8/2015 | Rawlinson et al. | |
| 2018/0134324 A1 * | 5/2018 | Son | B62D 25/2027 |
| 2018/0170165 A1 * | 6/2018 | Nakayama | B60K 1/04 |
| 2020/0062311 A1 | 2/2020 | Kawase | |
| 2021/0104717 A1 * | 4/2021 | Matsushima | B60K 1/04 |
| 2022/0105991 A1 * | 4/2022 | Kim | B62D 25/20 |
| 2022/0161855 A1 * | 5/2022 | Tatsuwaki | B62D 21/157 |
| 2024/0286477 A1 * | 8/2024 | Imashioya | H01M 50/202 |
| 2024/0375501 A1 * | 11/2024 | Jeong | B62D 25/145 |

FOREIGN PATENT DOCUMENTS

| | | |
|---|---|---|
| CN | 210101791 U | 2/2020 |
| JP | 2008-100585 | 5/2008 |
| JP | 2019-018822 | 2/2019 |
| KR | 10-2022-0126132 | 9/2022 |
| WO | WO2019/162583 | 8/2019 |

* cited by examiner

Primary Examiner — George C Jin
(74) Attorney, Agent, or Firm — Morgan Lewis & Bockius LLP

(57) ABSTRACT

A battery protection structure for a battery-mounted vehicle, includes center side members disposed below a center floor at opposite side portions of the vehicle, a plurality of center cross members disposed in a transverse direction of the vehicle to connect the center side members to each other, cross member extensions each connecting each of the center side members to each of side sills to be aligned with each of the center cross members, and a battery disposed below the center cross members between the center side members.

20 Claims, 9 Drawing Sheets

BATTERY PROTECTION STRUCTURE FOR BATTERY-EQUIPPED VEHICLE

CROSS REFERENCE TO RELATED APPLICATION

The present application claims priority to Korean Patent Application No. 10-2022-0187335, filed Dec. 28, 2022, the entire contents of which is incorporated herein for all purposes by this reference.

BACKGROUND OF THE PRESENT DISCLOSURE

Field of the Present Disclosure

The present disclosure relates to a technique for protecting a battery against a side impact of a battery-mounted vehicle.

Description of Related Art

A purpose built vehicle (PBV) is referred to as a vehicle. Such a vehicle is designed to meet the market demand of small quantity production of various kinds, composed by combining a drive module related to driving of a vehicle, and a life module providing various types of boarding and loading spaces according to market requirements.

Accordingly, there is an advantage in that a vehicle that meets the market demand may be rapidly produced by changing only the life module.

Furthermore, according to the recent trend of pursuing eco-friendliness in vehicle technology, the drive module is being developed in the direction of mounting a high-voltage battery (hereinbelow, simply referred to as "battery").

To implement low floor-ground clearance and sliding doors in the PBV, a section of a side sill must be spaced from a body cross member in a vertical direction. Therefore, in the event of side pole collision, because the side sill does not absorb enough energy and does not support a load, there is a disadvantageous aspect to battery protection.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery protection structure for a battery-mounted vehicle, the battery protection structure being configured for implementing low floor-ground clearance and installing sliding doors in a PBV, and efficiently protecting a battery mounted in the vehicle, efficiently securing battery protection performance against a side collision of the vehicle.

To achieve the above-described objective, according to an exemplary embodiment of the present disclosure, there is provided a battery protection structure for a battery-mounted vehicle, the battery protection structure including: center side members disposed below a center floor at opposite side portions of the vehicle: a plurality of center cross members disposed in a transverse direction of the vehicle to connect the center side members to each other: cross member extensions each connecting each of the center side members to each of side sills to be aligned with each of the center cross members: and a battery disposed below the center cross members between the center side members.

A side sill reinforcement may be provided inside each of the side sills, and the side sill reinforcement may have a section aligned with a section of each of the cross member extensions.

The side sill reinforcement may be provided to form a closed section together with a side sill internal panel forming each of the side sills: and a lower portion of the section the side sill reinforcement may be aligned with the section of each of the cross member extensions with the side sill internal panel located therebetween, in a horizontal direction thereof.

Each of the cross member extensions may be formed to connect the side sill internal panel to the center side members with a horizontal section; and the side sill reinforcement may be disposed so that the lower portion of a "C"-shape may form a horizontal section and be aligned with the section of each of the cross member extensions.

An additional side sill reinforcement may be provided to partition the closed section formed by the side sill reinforcement and the side sill internal panel into a plurality of closed sections.

Each of the center side members may be coupled to a lower portion of the center floor and forms a closed section together with the center floor: and a side member reinforcement may be provided inside each of the center side members, and the side member reinforcement may partition the closed section formed by each of the center side members and the center floor into a plurality of closed sections.

The side member reinforcement may be provided to partition the closed section formed by each of the center side members and the center floor into upper and lower parts; and a battery mounting side bracket may be provided inside a closed section formed between the side member reinforcement and each of the center side members for mounting the battery.

The battery may be provided so that a battery side frame providing a side surface part of a battery casing may be coupled to a lower portion of each of the center side members.

The battery side frame may include a vertical section part and a horizontal section part that are integrally connected to each other: the vertical section part may form a side surface of the battery casing: the horizontal section part may protrude horizontally from a lower portion of the vertical section part and be aligned with the lower portion of each of the center side members: and a battery mounting side bolt may penetrate the horizontal section part to be fastened to the battery mounting side bracket inside each of the center side members.

To increase an area where an end portion of each of the center cross members is connected to each of the center side members, a connection bracket may be provided to connect the end portion of each of the center cross members to each of the center side members.

To achieve the above-described objective, according to an exemplary embodiment of the present disclosure, there is provided a battery protection structure for a battery-mounted vehicle may include: center side members provided on opposite side portions of a vehicle body in a longitudinal direction of the vehicle body to form a closed section below the center floor: a plurality of center cross members provided in a transverse direction of the vehicle to connect the center side members to each other: cross member extensions respectively aligned with the center cross members, and provided to support an external surface of each of the center side members to each of side sills of the vehicle body: and a battery disposed in a space below the center cross members between the center side members, and mounted to the center side members and the center cross members.

To increase an area where each of the center cross members may be connected to each of the center side members, a connection bracket may be provided to connect an end portion of each of the center cross members to each of the center side members.

Each of the cross member extensions may be provided to connect a side sill internal panel to the center side members with a horizontal section.

A side sill reinforcement may be provided inside each of the side sills, and the side sill reinforcement may include a section aligned with a section of each of the cross member extensions.

The side sill reinforcement may be coupled to the side sill internal panel forming each of the side sills form a closed section: and an additional side sill reinforcement may be provided to partition the closed section formed by the side sill reinforcement and the side sill internal panel into a plurality of closed sections.

The side sill reinforcement and the additional side sill reinforcement may be disposed so that lower portions of "C"-shapes thereof form horizontal sections and be aligned with the horizontal section of each of the cross member extensions.

A side member reinforcement may be provided inside each of the center side members, and the side member reinforcement may partition the closed section formed by each of the center side members and the center floor into a plurality of closed sections that are vertically partitioned.

Inside each of the center side members, a battery mounting side bracket may be provided below the side member reinforcement for mounting the battery.

A battery mounting center bracket may be provided in each of the center cross members for fastening of the battery.

The battery may be mounted to the vehicle body by a battery mounting side bolt penetrating a battery side frame forming a side surface part of a battery casing of the battery to be coupled to the battery mounting side bracket of each of the center side members; and a battery mounting center bolt penetrating the battery to be fastened to the battery mounting center bracket of each of the center cross members.

The present disclosure is configured to implement a low floor-ground clearance and installing sliding doors in the PBV, and efficiently protecting the battery mounted in the vehicle, so that the battery protection performance against a side collision of the vehicle may be efficiently secured.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
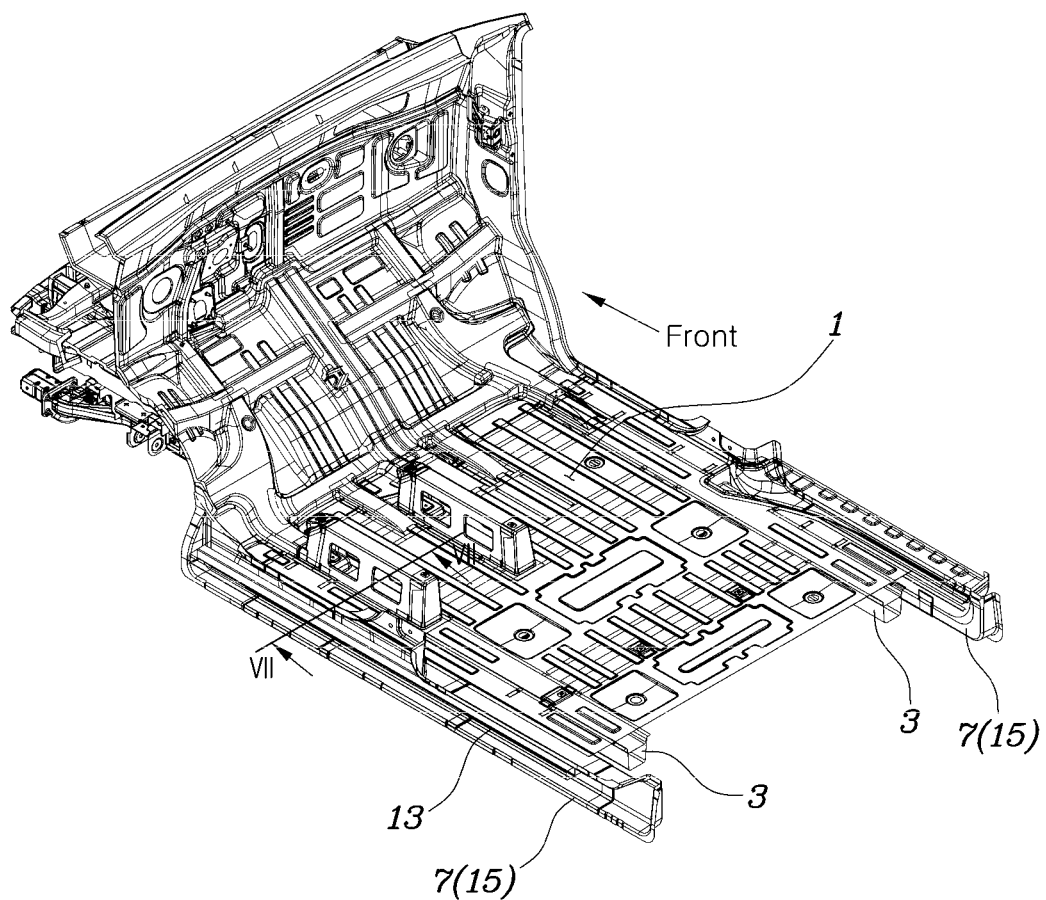
FIG. 1 is a view showing a portion of a vehicle body to which a battery protection structure for a battery-mounted vehicle according to an exemplary embodiment of the present disclosure is applied.
Figure 2:
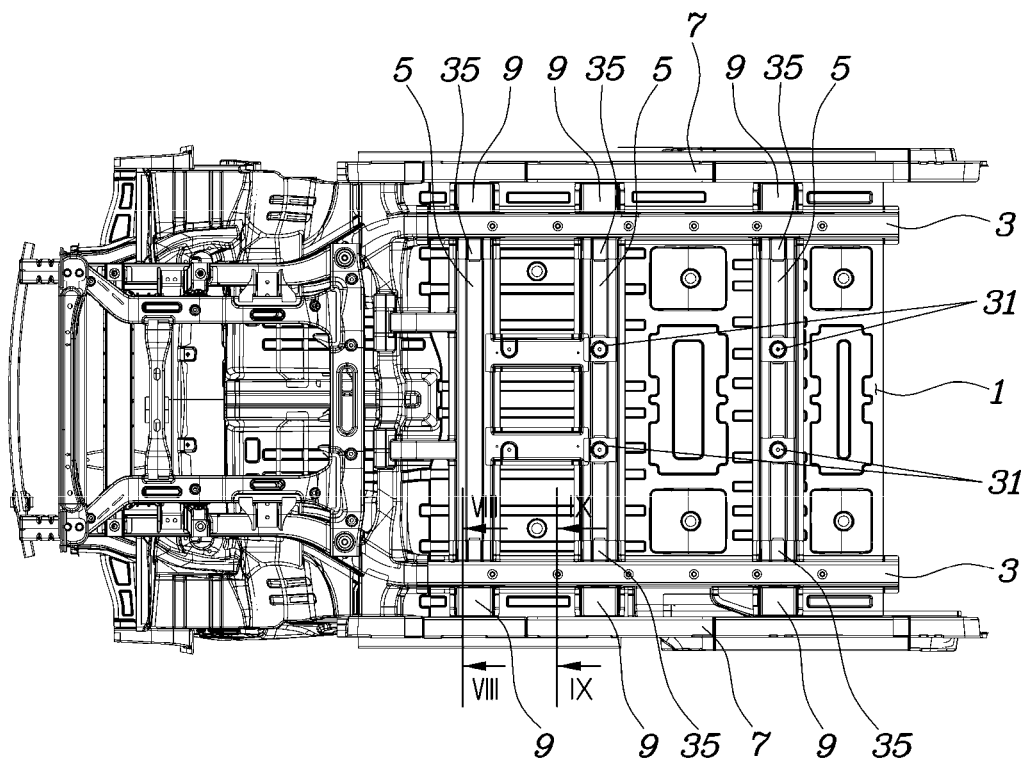
FIG. 2 is a bottom view of FIG. 1.
Figure 3:
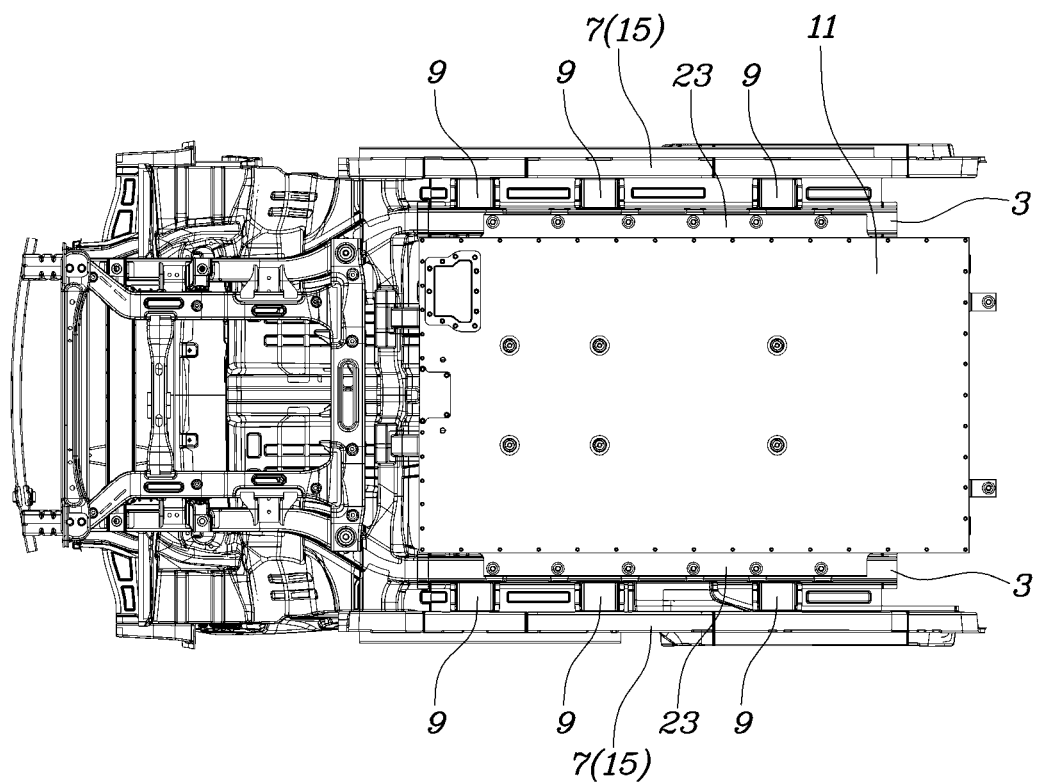
FIG. 3 is a view showing FIG. 2 with a mounted battery.
Figure 4:
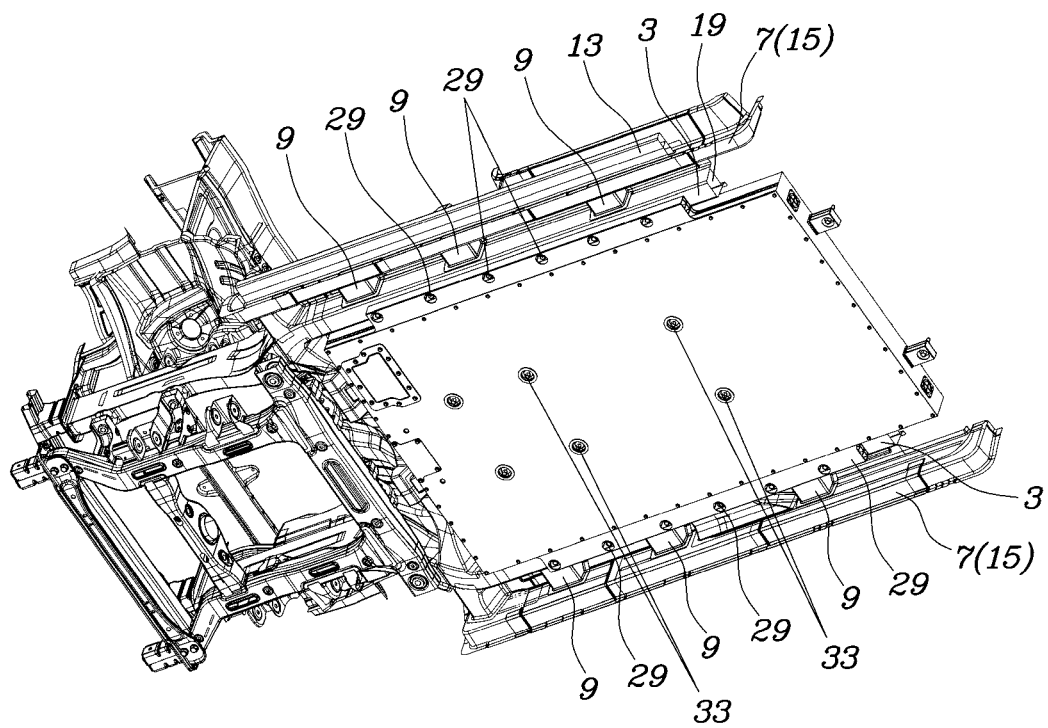
FIG. 4 is a perspective view of FIG. 3, the view being taken from the lower side of the vehicle body.
Figure 5:
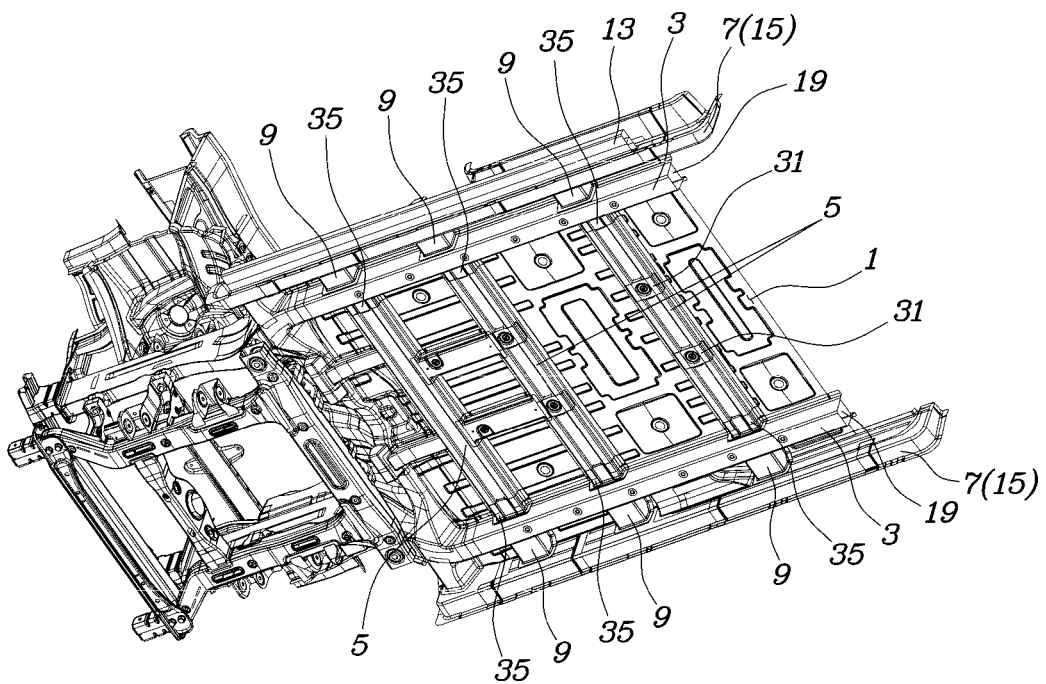
FIG. 5 is a view of FIG. 4 without the battery.
Figure 6:
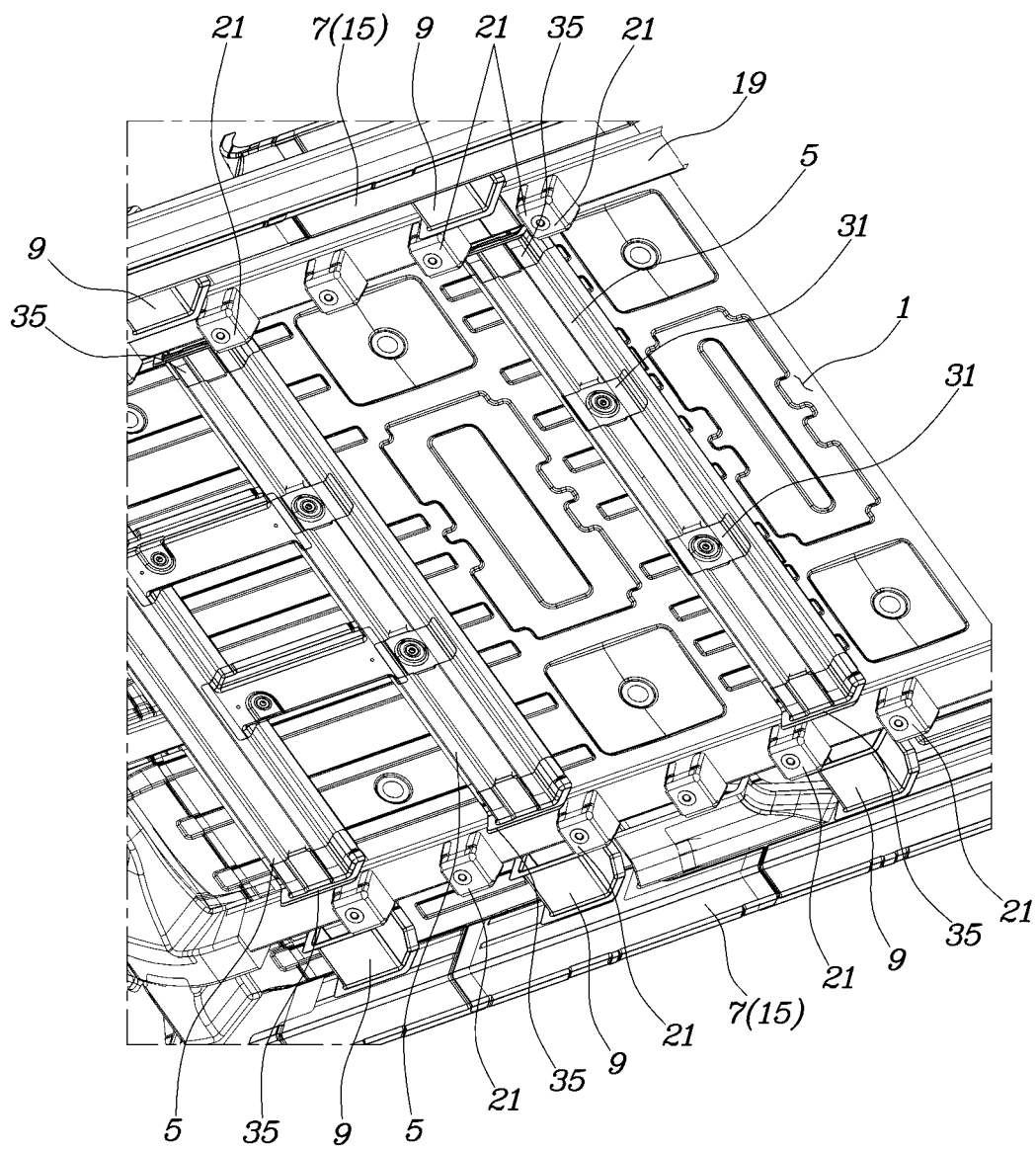
FIG. 6 is a main portion detailed view of FIG. 5 without a center side member.
Figure 7:
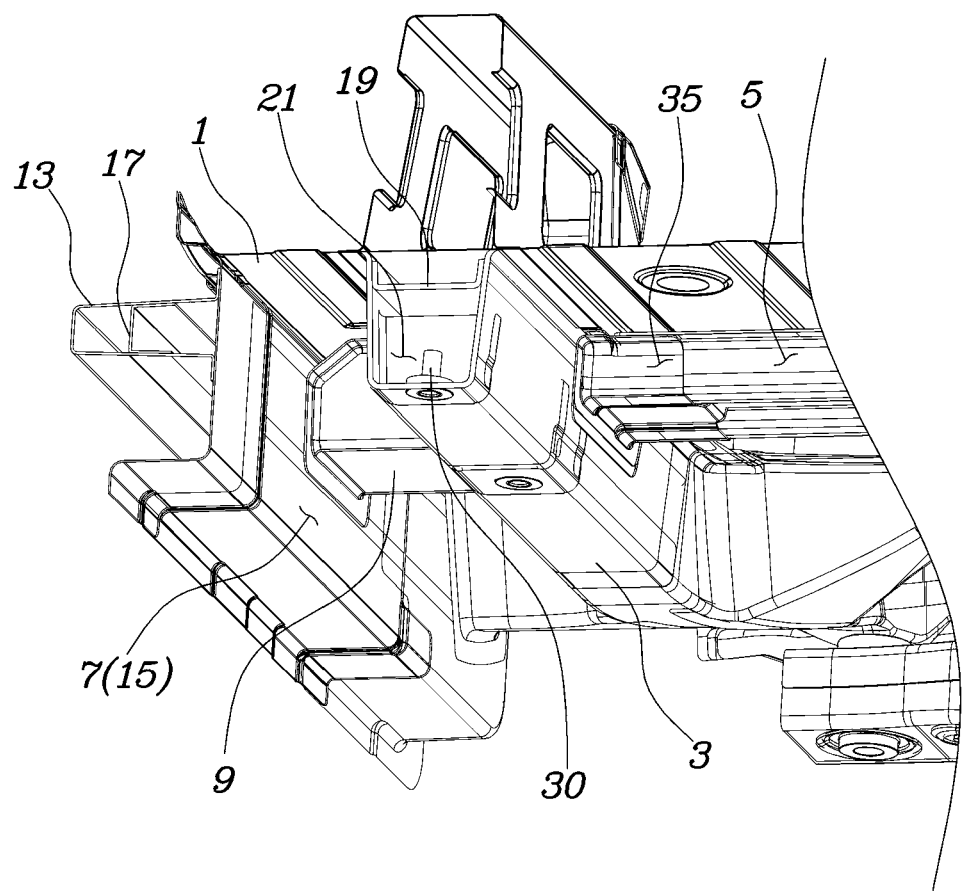
FIG. 7 is a sectional-perspective view taken along line VII-VII of FIG. 1.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, an exemplary embodiment described in the specification will be described in detail with reference to accompanying drawings, and regardless of the reference numerals, the same reference numerals will refer to the same or like parts, and redundant descriptions thereof will be omitted.

The suffixes "module" and "part" for the components used in the following description are provided or mixed in consideration of only the ease of writing the specification, and do not have distinct meanings or roles by themselves.

In the following description, if it is decided that the detailed description of known function or configuration related to the present disclosure makes the subject matter of the present disclosure unclear, the detailed description is omitted. Furthermore, the accompanying drawings are only for understanding of the exemplary embodiment of the present disclosure, and the technical ideas disclosed in the specification are not limited by the accompanying drawings, and those skilled in the art will appreciate that various modifications, additions and substitutions are possible, without departing from the scope and spirit of the present disclosure as disclosed in the accompanying claims.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween.

Singular forms are intended to include plural forms unless the context clearly indicates otherwise.

It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Referring to FIG. 1, FIG. 2, FIG. 3, FIG. 4, FIG. 5, FIG. 6, FIG. 7, FIG. 8 and FIG. 9, according to an exemplary embodiment of the present disclosure, a battery protection structure for a battery-mounted vehicle includes: center side members 3 disposed at opposite side portions of a vehicle, at a lower portion of a center floor 1: a plurality of center cross members 5 disposed in a transverse direction of the vehicle to connect the center side members 3 to each other: cross member extensions 9 respectively connecting the center side members 3 to side sills 7 and thus being aligned with the center cross members 5: and a battery 11 disposed below the center cross members 5 between the center side members 3.

In other words, according to the exemplary embodiment of the present disclosure, a load path reaching from the side sills 7 to the cross member extensions 9, the center side members 3, and the center cross members 5 is provided, and thus efficiently supporting a sideways impact of the vehicle applied from the outside of the side sills 7. Therefore, the battery 11 disposed between the center side members 3 may be efficiently protected from an impact.

A side sill reinforcement 13 is provided inside each of the side sills 7, and the side sill reinforcement 13 includes a section aligned with a section of the cross member extensions 9.

Therefore, against an impact applied from the side of each of the side sills 7, each of the side sills 7 may support with own enhanced rigidity, so that protection for the battery 11 may be made more effective.

The side sill reinforcement 13 is provided to form a closed section together with a side sill internal panel 15 forming each of the side sills 7: and a lower portion of the section of the side sill reinforcement 13 is aligned with the section of each of the cross member extensions 9, with the side sill internal panel 15 located therebetween, in a horizontal direction thereof.

Furthermore, the cross member extensions 9 is formed to connect the side sill internal panel 15 and each of the center side members 3 with a horizontal section: and the lower portion of a "C"-shape of the side sill reinforcement 13 forms a horizontal section and is aligned with the section of the cross member extensions 9.

Therefore, an external impact from the side of the vehicle applied to each of the side sills 7 is efficiently supported at the center side members 3 through the side sill reinforcement 13 and the cross member extensions 9, so that the protection for the battery 11 may be made more effective.

For example, each of the side sills 7 is formed so that the side sill internal panel 15 and a not-shown side sill external panel are coupled to each other to form a closed section including the side sill reinforcement 13.

Meanwhile, in the exemplary embodiment of the present disclosure, an additional side sill reinforcement 17 is provided inside the side sill reinforcement 13 to partition the closed section formed by the side sill reinforcement 13 and the side sill internal panel 15 into a plurality of closed sections.

Therefore, the rigidity of each of the side sills 7 may be further enhanced.

Each of the center side members 3 is coupled to a lower portion of the center floor 1 and forms a closed section together with the center floor 1: and a side member reinforcement 19 is provided inside each of the center side members 3 to partition the closed section formed by each of the center side members 3 and the center floor 1 into a plurality of closed sections.

Therefore, each of the center side members 3 receiving the side member reinforcement 19 can support a load input through each of the side sills 7 and each of the cross member extensions 9 with strong rigidity.

The side member reinforcement 19 is provided to partition the closed section formed by each of the center side members 3 and the center floor 1 into upper and lower parts: and a battery mounting side bracket 21 for mounting the battery 11 is provided inside the closed section formed between the side member reinforcement 19 and the center side members 3.

The battery 11 is provided so that a battery side frame 23 forming a side surface of a battery casing is coupled to a lower portion of each of the center side members 3.

The battery side frame 23 is provided so that a vertical section portion 25 and a horizontal section portion 27 are integrally connected to each other: the vertical section portion 25 forms the side surface of the battery casing: the horizontal section portion 27 protrudes horizontally from a lower portion of the vertical section portion 25 and is aligned with the lower portion of each of the center side members 3: and a battery mounting side bolt 29 is provided to penetrate the horizontal section portion 27 to be fastened to the inside portion of the battery mounting side bracket 21 inside each of the center side members 3.

For example, the battery mounting side bracket 21 includes a weld nut 30 to which the battery mounting side bolt 29 is fastened.

Furthermore, each of the center cross members 5 includes battery mounting center brackets 31, and a battery mounting center bolt 33 is fastened to each of the battery mounting center brackets 31 by penetrating a part of the battery 11, so that the battery 11 is securely fixed to the vehicle body.

For example, the vertical section portion 25 of the battery side frame 23 is spaced horizontally apart from an internal surface of the center side members 3, so that even when an impact applied from the outside space of each of the side sills 7 causes deformation to each of the center side members 3, it is possible to prevent the vertical section portion 25 of the battery side frame 23 from being instantly deformed.

Figure 8:
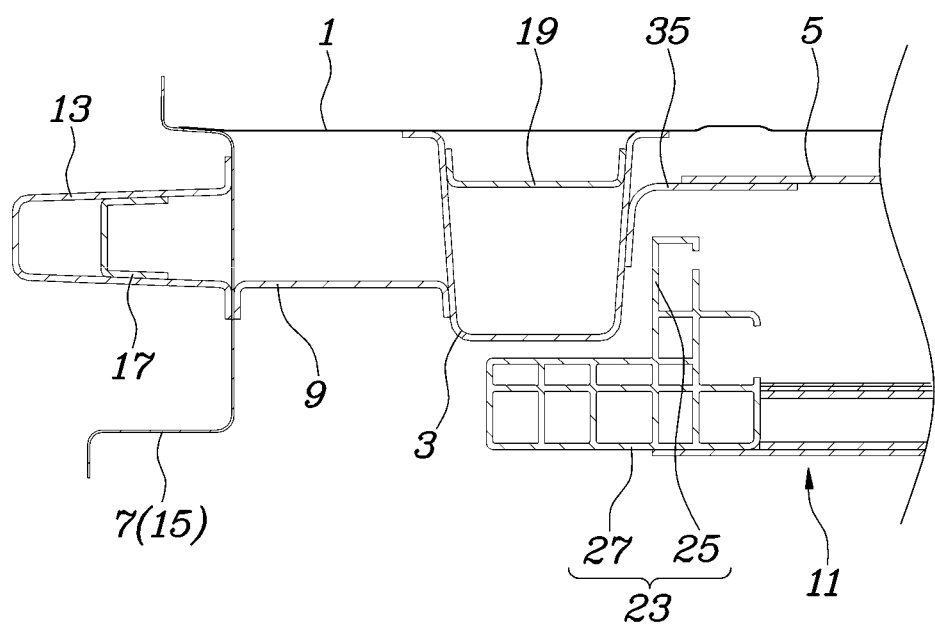
FIG. 8 is a sectional view taken along line VIII-VIII of FIG. 2.
Figure 9:
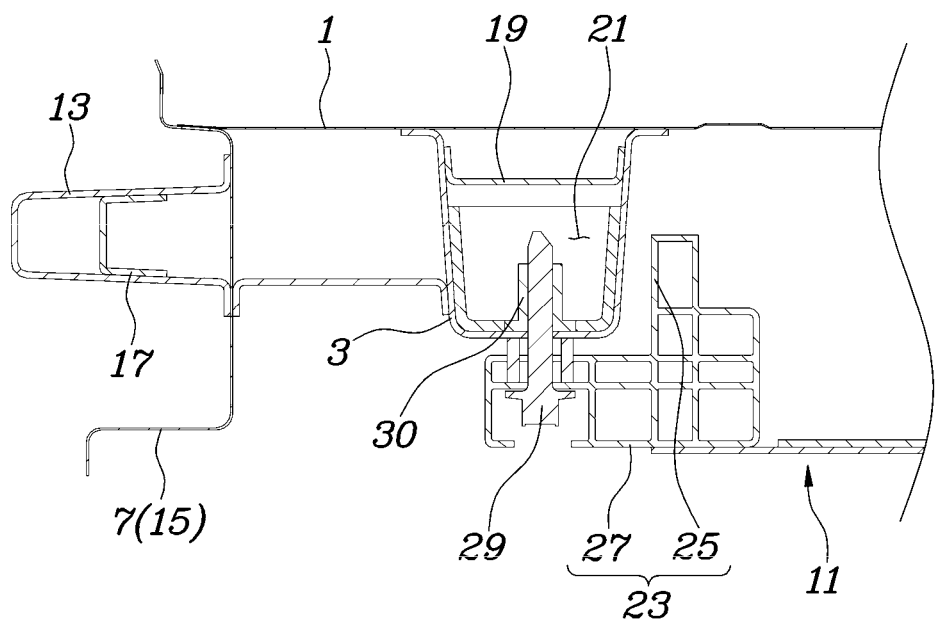
FIG. 9 is a sectional view taken along line IX-IX of FIG. 2.

For example, the battery 11 is provided so that the battery casing includes an upper cover and a lower cover that are coupled to an upper portion and a lower portion of the vertical section portion 25 of the battery side frame 23, and a battery cell is provided in the inside space formed by the battery casing, but FIG. 8 and FIG. 9 show only the battery side frame 23.

Meanwhile, to increase an area where an end portion of each of the center cross members 5 is connected to each of the center side members 3, a connection bracket 35 is provided to connect the end portion of each of the center cross members 5 to each of the center side members 3.

Therefore, when a load transmitted from the outside space of each of the side sills 7 is transmitted to each of the center side members 3, the connection bracket 35 may transmit a supporting force by each of the center cross members 5 to each of the center side members 3, with a large section.

The present disclosure as described above will be referred to as follows.

In other words, according to the exemplary embodiment of the present disclosure, the battery protection structure for the battery-mounted vehicle includes: the center side members 3 provided long in the longitudinal direction of the vehicle body at opposite side portions of the vehicle body to form a closed section below the center floor 1: the plurality of center cross members 5 provided long in the transverse direction of the vehicle body to connect the center side members 3 to each other: the cross member extensions 9 respectively aligned with the center cross members 5, and provided to support an external surface of each of the center side members 3 to each of the side sills 7 of the vehicle body; and the battery 11 disposed in a space below the center cross members 5 between the center side members 3, and mounted to the center side members 3 and the center cross members 5.

To increase an area where each of the center cross members 5 is connected to each of the center side members 3, the connection bracket 35 may be provided to connect the end portion of each of the center cross members 5 to each of the center side members 3.

Each of the cross member extensions 9 may be formed to connect the side sill internal panel 15 to each of the center side members 3 with a horizontal section.

The side sill reinforcement 13 may be provided inside each of the side sills 7 and the side sill reinforcement 13 may include the section aligned with the section of each of the cross member extensions 9.

The side sill reinforcement 13 is coupled to the side sill internal panel 15 forming each of the side sills 7 to form the closed section: and the additional side sill reinforcement 17 may be provided to partition the closed section formed by the side sill reinforcement 13 and the side sill internal panel 15 into the plurality of closed sections.

The side sill reinforcement 13 and the additional side sill reinforcement 17 may be disposed so that lower portions of "C"-shapes thereof form horizontal sections and are aligned with the horizontal section of each of the cross member extensions 9.

The side member reinforcement 19 is provided inside the center side members 3, and the side member reinforcement 19 partitions the closed section formed by each of the center side members 3 and the center floor 1 into the plurality of closed sections that are partitioned into upper and lower parts.

Inside the center side members 3, the battery mounting side bracket 21 may be provided below the side member reinforcement 19 to mount the battery.

The battery mounting center brackets 31 may be provided in each of the center cross members 5 to mount the battery 11.

The battery 11 may be mounted to the vehicle body by the battery mounting side bolt 29 penetrating the battery side frame 23 forming the side surface of the battery casing of the battery 11 to be coupled to the battery mounting side bracket 21 of each of the center side members 3: and the battery mounting center bolt 33 penetrating the battery 11 to be fastened to each of the battery mounting center brackets 31 provided in each of the center cross members 5.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery protection structure for a battery-mounted vehicle, the battery protection structure comprising:
    center side members disposed below a center floor at opposite side portions of the vehicle;
    a plurality of center cross members disposed in a transverse direction of the vehicle to connect the center side members to each other;
    cross member extensions, each connecting each of the center side members to each of side sills spaced from the center side members to be aligned with each of the center cross members; and
    a battery disposed below the center cross members between the center side members.

2. The battery protection structure of claim 1, wherein a side sill reinforcement is provided inside each of the side sills, and the side sill reinforcement includes a section aligned with a section of each of the cross member extensions.

3. The battery protection structure of claim 2,
    wherein the side sill reinforcement is provided to form a closed section together with a side sill internal panel forming each of the side sills, and
    wherein a lower portion of the section in the side sill reinforcement is aligned with the section of each of the cross member extensions with the side sill internal panel located therebetween, in a horizontal direction thereof.

4. The battery protection structure of claim 3,
    wherein each of the cross member extensions is formed to connect the side sill internal panel to the center side members with a horizontal section, and
    wherein the side sill reinforcement is disposed so that a lower portion of a "C"-shape in the side sill reinforcement forms a horizontal section and is aligned with the section of each of the cross member extensions.

5. The battery protection structure of claim 3, wherein an additional side sill reinforcement is provided to partition the closed section formed by the side sill reinforcement and the side sill internal panel into a plurality of closed sections.

6. The battery protection structure of claim 1,
wherein each of the center side members is coupled to a lower portion of the center floor and forms a closed section together with the center floor, and
wherein a side member reinforcement is provided inside each of the center side members, and the side member reinforcement partitions the closed section formed by each of the center side members and the center floor into a plurality of closed sections.

7. The battery protection structure of claim 6,
wherein the side member reinforcement is provided to partition the closed section formed by each of the center side members and the center floor into upper and lower portions among the plurality of closed sections, and
wherein a battery mounting side bracket is provided inside a closed section formed between the side member reinforcement and each of the center side members for mounting the battery.

8. The battery protection structure of claim 7, wherein the battery is provided so that a battery side frame providing a side surface portion of a battery casing is coupled to a lower portion of each of the center side members.

9. The battery protection structure of claim 8,
wherein the battery side frame includes a vertical section portion and a horizontal section portion that are integrally connected to each other,
wherein the vertical section portion forms the side surface portion of the battery casing,
wherein the horizontal section portion protrudes horizontally from a lower portion of the vertical section portion and is aligned with the lower portion of each of the center side members, and
wherein a battery mounting side bolt is provided to penetrate the horizontal section portion to be fastened to the battery mounting side bracket inside each of the center side members.

10. The battery protection structure of claim 1, wherein to increase an area where an end portion of each of the center cross members is connected to each of the center side members, a connection bracket is provided to connect the end portion of each of the center cross members to each of the center side members.

11. A battery protection structure for a battery-mounted vehicle, the battery protection structure comprising:
center side members disposed on opposite side portions of a vehicle body in a longitudinal direction of the vehicle body to form a closed section below a center floor;
a plurality of center cross members disposed in a transverse direction of the vehicle to connect the center side members to each other;
cross member extensions respectively aligned with the center cross members, and disposed to support an external surface of each of the center side members to each of side sills of the vehicle body, wherein the side sills are spaced from the center side members; and
a battery disposed in a space below the center cross members between the center side members, and mounted to the center side members and the center cross members.

12. The battery protection structure of claim 11, wherein to increase an area where each of the center cross members is connected to each of the center side members, a connection bracket is provided to connect an end portion of each of the center cross members to each of the center side members.

13. The battery protection structure of claim 11, wherein each of the cross member extensions is provided to connect a side sill internal panel to the center side members with a horizontal section.

14. The battery protection structure of claim 13, wherein a side sill reinforcement is provided inside each of the side sills, and the side sill reinforcement includes a section aligned with a section of each of the cross member extensions.

15. The battery protection structure of claim 14,
wherein the side sill reinforcement is coupled to the side sill internal panel forming each of the side sills form a closed section, and
wherein an additional side sill reinforcement is provided to partition the closed section formed by the side sill reinforcement and the side sill internal panel into a plurality of closed sections.

16. The battery protection structure of claim 15, wherein the side sill reinforcement and the additional side sill reinforcement are disposed so that lower portions of "C"-shapes thereof form horizontal sections and are aligned with the horizontal section of each of the cross member extensions.

17. The battery protection structure of claim 11, wherein a side member reinforcement is provided inside each of the center side members, and the side member reinforcement partitions the closed section formed by each of the center side members and the center floor into a plurality of closed sections that are vertically partitioned.

18. The battery protection structure of claim 17, wherein, inside each of the center side members, a battery mounting side bracket is provided below the side member reinforcement for mounting the battery.

19. The battery protection structure of claim 18, wherein a battery mounting center bracket is provided in each of the center cross members for fastening of the battery.

20. The battery protection structure of claim 19,
wherein the battery is mounted to the vehicle body by a battery mounting side bolt penetrating a battery side frame forming a side surface portion of a battery casing of the battery to be coupled to the battery mounting side bracket of each of the center side members; and
wherein a battery mounting center bolt is provided to penetrate the battery to be fastened to the battery mounting center bracket of each of the center cross members.

* * * * *